United States Patent
Wilczynski et al.

(10) Patent No.: US 11,809,682 B2
(45) Date of Patent: Nov. 7, 2023

(54) SYSTEMS AND METHODS FOR VISUALLY PRESENTING GEOSPATIAL INFORMATION

(71) Applicant: Palantir Technologies Inc., Palo Alto, CA (US)

(72) Inventors: Peter Wilczynski, San Francisco, CA (US); Andrew Elder, New York, NY (US); Jeffrey Bagdis, Arlington, VA (US); Ryan Zheng, Mountain View, CA (US)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 17/737,890

(22) Filed: May 5, 2022

(65) Prior Publication Data

US 2022/0276766 A1 Sep. 1, 2022

Related U.S. Application Data

(63) Continuation of application No. 15/788,043, filed on Oct. 19, 2017, now Pat. No. 11,334,216.
(Continued)

(51) Int. Cl.
*G06F 3/04817* (2022.01)
*G06F 3/04847* (2022.01)
(Continued)

(52) U.S. Cl.
CPC ...... *G06F 3/04817* (2013.01); *G06F 3/04847* (2013.01); *G06F 16/29* (2019.01); *G06F 16/9537* (2019.01); *G06T 11/206* (2013.01)

(58) Field of Classification Search
None
See application file for complete search history.

(56) References Cited

U.S. PATENT DOCUMENTS 4,899,161 A 2/1990 Morin, Jr. et al.
4,958,305 A 9/1990 Piazza
(Continued)

FOREIGN PATENT DOCUMENTS

AU 2012216622 A1 4/2013
DE 102013222023 A1 1/2015
(Continued)

OTHER PUBLICATIONS

"A First Look: Predicting Market Demand for Food Retail using a Huff Analysis," TRF Policy Solutions, Jul. 2012, pp. 30.
(Continued)

*Primary Examiner* — Haimei Jiang
(74) *Attorney, Agent, or Firm* — Sheppard Mullin Richter & Hampton LLP

(57) ABSTRACT

Systems, methods, and non-transitory computer readable media are provided for visually presenting geospatial information. An information request for an area may be received. The area may include one or more predefined regions. The predefined region(s) may be subdivided into one or more levels of predefined sub-regions. Information for the area may be accessed. The information for the area may include region information for the predefined region(s) or sub-region information for the predefined sub-regions. A response to the information request may be determined based on the region information or the sub-region information. The response may enable a visual presentation of (1) the information for the area, and (2) one or more geographical boundaries corresponding to the area.

16 Claims, 6 Drawing Sheets

Related U.S. Application Data

(60) Provisional application No. 62/512,638, filed on May 30, 2017.

(51) Int. Cl.
 *G06T 11/20* (2006.01)
 *G06F 16/29* (2019.01)
 *G06F 16/9537* (2019.01)

(56) References Cited

U.S. PATENT DOCUMENTS

| | | | |
|---|---|---|---|
| 5,329,108 A | 7/1994 | Lamoure | |
| 5,754,182 A | 5/1998 | Kobayashi | |
| 5,781,195 A | 7/1998 | Marvin | |
| 5,781,704 A | 7/1998 | Rossmo | |
| 6,091,956 A | 7/2000 | Hollenberg | |
| 6,100,897 A | 8/2000 | Mayer et al. | |
| 6,157,747 A | 12/2000 | Szeliski et al. | |
| 6,169,552 B1 | 1/2001 | Endo et al. | |
| 6,173,067 B1 | 1/2001 | Payton et al. | |
| 6,178,432 B1 | 1/2001 | Cook et al. | |
| 6,247,019 B1 | 6/2001 | Davies | |
| 6,389,289 B1 | 5/2002 | Voce et al. | |
| 6,414,683 B1 | 7/2002 | Gueziec | |
| 6,483,509 B1 | 11/2002 | Rabenhorst | |
| 6,529,900 B1 | 3/2003 | Patterson et al. | |
| 6,631,496 B1 | 10/2003 | Li et al. | |
| 6,662,103 B1 | 12/2003 | Skolnick et al. | |
| 6,757,445 B1 | 6/2004 | Knopp | |
| 6,828,920 B2 | 12/2004 | Owen et al. | |
| 6,958,753 B2 | 10/2005 | Abe | |
| 6,983,203 B1 | 1/2006 | Wako | |
| 6,985,950 B1 | 1/2006 | Hanson et al. | |
| 7,036,085 B2 | 4/2006 | Barros | |
| 7,051,291 B2 | 5/2006 | Sciammarella et al. | |
| 7,158,878 B2 | 1/2007 | Rasmussen et al. | |
| 7,375,732 B2 | 5/2008 | Aguera Y Arcas | |
| 7,379,811 B2 | 5/2008 | Rasmussen et al. | |
| 7,457,706 B2 | 11/2008 | Melero et al. | |
| 7,502,786 B2 | 3/2009 | Liu et al. | |
| 7,519,470 B2 | 4/2009 | Brasche et al. | |
| 7,529,195 B2 | 5/2009 | Gorman | |
| 7,539,666 B2 | 5/2009 | Ashworth et al. | |
| 7,558,677 B2 | 7/2009 | Jones | |
| 7,574,428 B2 | 8/2009 | Leiserowitz et al. | |
| 7,579,965 B2 | 8/2009 | Bucholz | |
| 7,617,314 B1 | 11/2009 | Bansod et al. | |
| 7,620,628 B2 | 11/2009 | Kapur et al. | |
| 7,663,621 B1 | 2/2010 | Allen et al. | |
| 7,791,616 B2 | 9/2010 | Ioup et al. | |
| 7,805,457 B1 | 9/2010 | Viola et al. | |
| 7,809,703 B2 | 10/2010 | Balabhadrapatruni et al. | |
| 7,872,647 B2 | 1/2011 | Mayer et al. | |
| 7,894,984 B2 | 2/2011 | Rasmussen et al. | |
| 7,899,611 B2 | 3/2011 | Downs et al. | |
| 7,920,963 B2 | 4/2011 | Jouline et al. | |
| 7,945,852 B1 | 5/2011 | Pilskalns | |
| 7,962,281 B2 | 6/2011 | Rasmussen et al. | |
| 7,970,240 B1 | 6/2011 | Chao et al. | |
| 8,010,545 B2 | 8/2011 | Stefik et al. | |
| 8,036,632 B1 | 10/2011 | Cona et al. | |
| 8,065,080 B2 | 11/2011 | Koch | |
| 8,085,268 B2 | 12/2011 | Carrino et al. | |
| 8,134,457 B2 | 3/2012 | Velipasalar et al. | |
| 8,145,703 B2 | 3/2012 | Frishert et al. | |
| 8,200,676 B2 | 6/2012 | Frank | |
| 8,214,361 B1 | 7/2012 | Sandler et al. | |
| 8,214,764 B2 | 7/2012 | Gemmell et al. | |
| 8,229,947 B2 | 7/2012 | Fujinaga | |
| 8,230,333 B2 | 7/2012 | Decherd et al. | |
| 8,290,942 B2 | 10/2012 | Jones et al. | |
| 8,290,943 B2 | 10/2012 | Carbone et al. | |
| 8,301,464 B1 | 10/2012 | Cave et al. | |
| 8,325,178 B1 | 12/2012 | Doyle, Jr. | |
| 8,368,695 B2 | 2/2013 | Howell et al. | |
| 8,397,171 B2 | 3/2013 | Klassen et al. | |
| 8,400,448 B1 | 3/2013 | Doyle, Jr. | |
| 8,407,180 B1 | 3/2013 | Ramesh et al. | |
| 8,412,234 B1 | 4/2013 | Gatmir-Motahar et al. | |
| 8,412,707 B1 | 4/2013 | Mianji | |
| 8,422,825 B1 | 4/2013 | Neophytou et al. | |
| 8,452,790 B1 | 5/2013 | Mianji | |
| 8,463,036 B1 | 6/2013 | Ramesh et al. | |
| 8,489,331 B2 | 7/2013 | Kopf et al. | |
| 8,489,641 B1 | 7/2013 | Seefeld et al. | |
| 8,498,984 B1 | 7/2013 | Hwang et al. | |
| 8,508,533 B2 | 8/2013 | Cervelli et al. | |
| 8,514,229 B2 | 8/2013 | Cervelli et al. | |
| 8,515,207 B2 * | 8/2013 | Chau | G06F 16/58 700/62 |
| 8,564,596 B2 | 10/2013 | Carrino et al. | |
| 8,742,934 B1 | 6/2014 | Sarpy, Sr. et al. | |
| 8,781,169 B2 | 7/2014 | Jackson et al. | |
| 8,799,799 B1 * | 8/2014 | Cervelli | G09B 29/106 707/723 |
| 8,830,322 B2 | 9/2014 | Nerayoff et al. | |
| 8,938,686 B1 | 1/2015 | Erenrich et al. | |
| 8,949,164 B1 | 2/2015 | Mohler | |
| 9,009,177 B2 | 4/2015 | Zheng et al. | |
| 9,009,610 B2 * | 4/2015 | Florance | G06Q 10/06 715/781 |
| 9,021,384 B1 | 4/2015 | Beard et al. | |
| 9,104,293 B1 | 8/2015 | Kornfeld et al. | |
| 9,104,695 B1 | 8/2015 | Cervelli et al. | |
| 9,111,380 B2 | 8/2015 | Piemonte et al. | |
| 9,129,219 B1 | 9/2015 | Robertson et al. | |
| 9,146,125 B2 | 9/2015 | Vulcano et al. | |
| 9,460,175 B1 | 10/2016 | Hong | |
| 10,013,156 B2 * | 7/2018 | Takehara | G06F 3/04842 |
| 11,175,157 B1 * | 11/2021 | Elder | G01C 21/3664 |
| 11,334,216 B2 | 5/2022 | Wilczynski et al. | |
| 2002/0116120 A1 | 8/2002 | Ruiz et al. | |
| 2002/0130867 A1 | 9/2002 | Yang et al. | |
| 2002/0130906 A1 | 9/2002 | Miyaki | |
| 2003/0052896 A1 | 3/2003 | Higgins et al. | |
| 2003/0103049 A1 | 6/2003 | Kindratenko et al. | |
| 2003/0144868 A1 | 7/2003 | MacIntyre et al. | |
| 2003/0163352 A1 | 8/2003 | Surpin et al. | |
| 2003/0225755 A1 | 12/2003 | Iwayama et al. | |
| 2004/0030492 A1 | 2/2004 | Fox et al. | |
| 2004/0039498 A1 | 2/2004 | Ollis et al. | |
| 2004/0098236 A1 | 5/2004 | Mayer et al. | |
| 2005/0031197 A1 | 2/2005 | Knopp | |
| 2005/0034062 A1 | 2/2005 | Bufkin et al. | |
| 2005/0080769 A1 | 4/2005 | Gemmell et al. | |
| 2005/0143602 A1 | 6/2005 | Yada et al. | |
| 2005/0162523 A1 | 7/2005 | Darrell et al. | |
| 2005/0182502 A1 | 8/2005 | Iyengar | |
| 2005/0182793 A1 | 8/2005 | Keenan et al. | |
| 2005/0223044 A1 | 10/2005 | Ashworth et al. | |
| 2005/0267652 A1 | 12/2005 | Allstadt et al. | |
| 2006/0026170 A1 | 2/2006 | Kreitler et al. | |
| 2006/0139375 A1 | 6/2006 | Rasmussen et al. | |
| 2006/0146050 A1 | 7/2006 | Yamauchi | |
| 2006/0149596 A1 | 7/2006 | Surpin et al. | |
| 2006/0197837 A1 | 9/2006 | Flath et al. | |
| 2006/0200384 A1 | 9/2006 | Arutunian et al. | |
| 2006/0241974 A1 | 10/2006 | Chao et al. | |
| 2006/0251307 A1 | 11/2006 | Florin et al. | |
| 2006/0259527 A1 | 11/2006 | Devarakonda et al. | |
| 2006/0271277 A1 | 11/2006 | Hu et al. | |
| 2006/0279630 A1 | 12/2006 | Aggarwal et al. | |
| 2007/0011150 A1 | 1/2007 | Frank | |
| 2007/0016363 A1 | 1/2007 | Huang et al. | |
| 2007/0024620 A1 | 2/2007 | Muller-Fischer et al. | |
| 2007/0057966 A1 | 3/2007 | Ohno et al. | |
| 2007/0078832 A1 | 4/2007 | Ott et al. | |
| 2007/0115373 A1 | 5/2007 | Gallagher et al. | |
| 2007/0188516 A1 | 8/2007 | Ioup et al. | |
| 2007/0208497 A1 | 9/2007 | Downs et al. | |
| 2007/0208498 A1 | 9/2007 | Barker et al. | |
| 2007/0258642 A1 | 11/2007 | Thota | |
| 2007/0294643 A1 | 12/2007 | Kyle | |
| 2008/0010273 A1 | 1/2008 | Frank | |

(56) References Cited

U.S. PATENT DOCUMENTS

| | | |
|---|---|---|
| 2008/0010605 A1 | 1/2008 | Frank |
| 2008/0040684 A1 | 2/2008 | Crump |
| 2008/0051994 A1* | 2/2008 | Fisher ................... G06Q 30/02 |
| | | 701/414 |
| 2008/0077642 A1 | 3/2008 | Carbone et al. |
| 2008/0082578 A1 | 4/2008 | Hogue et al. |
| 2008/0098085 A1 | 4/2008 | Krane et al. |
| 2008/0104019 A1 | 5/2008 | Nath |
| 2008/0133579 A1 | 6/2008 | Lim |
| 2008/0162031 A1* | 7/2008 | Okuyama ............ G09B 29/007 |
| | | 701/532 |
| 2008/0163073 A1 | 7/2008 | Becker et al. |
| 2008/0192053 A1 | 8/2008 | Howell et al. |
| 2008/0195417 A1 | 8/2008 | Surpin et al. |
| 2008/0223834 A1 | 9/2008 | Griffiths et al. |
| 2008/0229056 A1 | 9/2008 | Agarwal et al. |
| 2008/0263468 A1 | 10/2008 | Cappione et al. |
| 2008/0267107 A1 | 10/2008 | Rosenberg |
| 2008/0270468 A1 | 10/2008 | Mao et al. |
| 2008/0278311 A1 | 11/2008 | Grange et al. |
| 2008/0288306 A1 | 11/2008 | MacIntyre et al. |
| 2008/0294678 A1 | 11/2008 | Gorman et al. |
| 2008/0301643 A1 | 12/2008 | Appleton et al. |
| 2009/0002492 A1 | 1/2009 | Velipasalar et al. |
| 2009/0027418 A1 | 1/2009 | Maru et al. |
| 2009/0088964 A1 | 4/2009 | Schaaf et al. |
| 2009/0100018 A1 | 4/2009 | Roberts |
| 2009/0115786 A1 | 5/2009 | Shimasaki et al. |
| 2009/0132921 A1 | 5/2009 | Hwangbo et al. |
| 2009/0132953 A1 | 5/2009 | Reed, Jr. et al. |
| 2009/0144262 A1 | 6/2009 | White et al. |
| 2009/0158185 A1 | 6/2009 | Lacevic et al. |
| 2009/0171939 A1 | 7/2009 | Athsani et al. |
| 2009/0172511 A1 | 7/2009 | Decherd et al. |
| 2009/0179892 A1 | 7/2009 | Tsuda et al. |
| 2009/0187447 A1 | 7/2009 | Cheng et al. |
| 2009/0187464 A1 | 7/2009 | Bai et al. |
| 2009/0222400 A1 | 9/2009 | Kupershmidt et al. |
| 2009/0292626 A1 | 11/2009 | Oxford |
| 2009/0303251 A1* | 12/2009 | Balogh ................. G06T 17/005 |
| | | 345/632 |
| 2010/0057716 A1 | 3/2010 | Stefik et al. |
| 2010/0063961 A1 | 3/2010 | Guiheneuf et al. |
| 2010/0070523 A1 | 3/2010 | Delgo et al. |
| 2010/0076968 A1 | 3/2010 | Boyns et al. |
| 2010/0106420 A1 | 4/2010 | Mattikalli et al. |
| 2010/0162176 A1 | 6/2010 | Dunton |
| 2010/0198684 A1 | 8/2010 | Eraker et al. |
| 2010/0199225 A1 | 8/2010 | Coleman et al. |
| 2010/0277611 A1 | 11/2010 | Holt et al. |
| 2010/0293174 A1 | 11/2010 | Bennett et al. |
| 2010/0305851 A1* | 12/2010 | Meyer ..................... G01C 21/20 |
| | | 701/532 |
| 2010/0321399 A1 | 12/2010 | Ellren et al. |
| 2011/0022312 A1 | 1/2011 | McDonough et al. |
| 2011/0072020 A1* | 3/2011 | Ngo ........................ G01C 21/20 |
| | | 709/219 |
| 2011/0090254 A1 | 4/2011 | Carrino et al. |
| 2011/0117878 A1 | 5/2011 | Barash et al. |
| 2011/0137766 A1 | 6/2011 | Rasmussen et al. |
| 2011/0145228 A1* | 6/2011 | Laurenzo ............ G06F 16/9537 |
| | | 707/723 |
| 2011/0153368 A1 | 6/2011 | Pierre et al. |
| 2011/0161096 A1 | 6/2011 | Buehler et al. |
| 2011/0170799 A1 | 7/2011 | Carrino et al. |
| 2011/0208724 A1 | 8/2011 | Jones et al. |
| 2011/0218934 A1 | 9/2011 | Elser |
| 2011/0223888 A1 | 9/2011 | Esaki |
| 2011/0225198 A1 | 9/2011 | Edwards et al. |
| 2011/0238690 A1 | 9/2011 | Arrasvuori et al. |
| 2011/0270705 A1 | 11/2011 | Parker |
| 2012/0066296 A1 | 3/2012 | Appleton et al. |
| 2012/0084118 A1 | 4/2012 | Bai et al. |
| 2012/0106801 A1 | 5/2012 | Jackson |
| 2012/0144335 A1 | 6/2012 | Abeln et al. |
| 2012/0158527 A1 | 6/2012 | Cannelongo et al. |
| 2012/0159363 A1 | 6/2012 | DeBacker et al. |
| 2012/0173985 A1 | 7/2012 | Peppel |
| 2012/0178473 A1* | 7/2012 | Wiren ..................... G01S 5/0009 |
| | | 455/456.2 |
| 2012/0206469 A1 | 8/2012 | Hulubei et al. |
| 2012/0208636 A1 | 8/2012 | Feige |
| 2012/0221580 A1 | 8/2012 | Barney |
| 2012/0323888 A1 | 12/2012 | Osann, Jr. |
| 2013/0006725 A1 | 1/2013 | Simanek et al. |
| 2013/0021445 A1 | 1/2013 | Cossette-Pacheco et al. |
| 2013/0057551 A1 | 3/2013 | Ebert et al. |
| 2013/0060786 A1 | 3/2013 | Serrano et al. |
| 2013/0073377 A1 | 3/2013 | Heath |
| 2013/0076732 A1 | 3/2013 | Cervelli et al. |
| 2013/0100134 A1 | 4/2013 | Cervelli et al. |
| 2013/0101159 A1 | 4/2013 | Chao et al. |
| 2013/0150004 A1 | 6/2013 | Rosen |
| 2013/0176321 A1 | 7/2013 | Mitchell et al. |
| 2013/0179420 A1 | 7/2013 | Park et al. |
| 2013/0254900 A1 | 9/2013 | Sathish et al. |
| 2013/0268520 A1 | 10/2013 | Fisher et al. |
| 2013/0279757 A1 | 10/2013 | Kephart |
| 2013/0282723 A1 | 10/2013 | Petersen et al. |
| 2013/0339891 A1 | 12/2013 | Blumenberg et al. |
| 2014/0011522 A1* | 1/2014 | Lin .......................... H04W 4/02 |
| | | 455/456.2 |
| 2014/0176606 A1 | 6/2014 | Narayan et al. |
| 2014/0218400 A1 | 8/2014 | O'Toole et al. |
| 2014/0333651 A1 | 11/2014 | Cervelli et al. |
| 2014/0337772 A1 | 11/2014 | Cervelli et al. |
| 2014/0361899 A1 | 12/2014 | Layson |
| 2014/0379850 A1* | 12/2014 | Peterson ................ H04W 4/029 |
| | | 709/217 |
| 2015/0029176 A1 | 1/2015 | Baxter et al. |
| 2015/0095355 A1* | 4/2015 | Patton ..................... H04W 4/021 |
| | | 707/754 |
| 2015/0100907 A1 | 4/2015 | Erenrich et al. |
| 2015/0106170 A1 | 4/2015 | Bonica |
| 2015/0186821 A1 | 7/2015 | Wang et al. |
| 2015/0187036 A1 | 7/2015 | Wang et al. |
| 2015/0187100 A1 | 7/2015 | Berry et al. |
| 2015/0312323 A1 | 10/2015 | Peterson |
| 2015/0338233 A1 | 11/2015 | Cervelli et al. |
| 2015/0347457 A1 | 12/2015 | Zhu et al. |
| 2015/0356088 A1 | 12/2015 | Berkhin et al. |
| 2015/0370828 A1 | 12/2015 | Maurer et al. |
| 2015/0371430 A1* | 12/2015 | Brewington ............ G06T 17/05 |
| | | 345/428 |
| 2015/0379413 A1 | 12/2015 | Robertson et al. |
| 2016/0180060 A1* | 6/2016 | Nelson ................... G16H 50/80 |
| | | 702/19 |
| 2017/0076227 A1* | 3/2017 | Elgie ........................ H04L 9/3247 |
| 2017/0091627 A1* | 3/2017 | Terrazas .................. G06F 16/29 |
| 2019/0057136 A1* | 2/2019 | Constantinides ..... G06F 16/248 |
| 2019/0130498 A1* | 5/2019 | Constantinides ...... G06Q 50/01 |

FOREIGN PATENT DOCUMENTS

| | | |
|---|---|---|
| EP | 0763201 A1 | 3/1997 |
| EP | 2575107 A2 | 4/2013 |
| EP | 2858014 A2 | 4/2015 |
| EP | 2963595 A1 | 1/2016 |
| EP | 3101559 A1 | 12/2016 |
| GB | 2516155 A | 1/2015 |
| NL | 2012778 A | 11/2014 |
| NZ | 624557 A | 8/2014 |
| WO | 9532424 A1 | 11/1995 |
| WO | 0009529 A2 | 2/2000 |
| WO | 0198925 A2 | 12/2001 |
| WO | 2004057268 A2 | 7/2004 |
| WO | 2005013200 A1 | 2/2005 |
| WO | 2008064207 | 5/2008 |
| WO | 2008128133 A1 | 10/2008 |
| WO | 2009061501 A1 | 5/2009 |

(56) References Cited

FOREIGN PATENT DOCUMENTS

| WO | 2009123975 A1 | 10/2009 |
|---|---|---|
| WO | 2011058507 A1 | 5/2011 |

OTHER PUBLICATIONS

"Andy Turner's GISRUK 2012 Notes" <https://docs.google.com/document/d/1cTmxg7mVx5gd89IqbICYvCEnHA4QAivH4-I4WpyPsqE4/edit?pli=I > printed Sep. 16, 2013 in 15 pages.

"How to Georectify an Image in ArcMap 10," dated Feb. 23, 2014, 8 pages, retrieved from http://web.archive.org/web/20140223140531/gis.unc.edu/data/geog370/Georef- erencingLabGEOG37Q_Spring2013.pdf.

"HunchLab: Heat Map and Kernel Density Calculation for Crime Analysis," Azavea Journal, printed from www.azavea.com/blogs/newsletter/v4i4/kernel-density-capabilities-added-to- -hunchlab/ on Sep. 9, 2014, 2 pages.

Barnes et al., "Viewshed Analysis", GIS-ARC/INFO 2001, <www.evsc.virginia.edu/.about.jhp7e/evsc466/student_pres/Rounds.pdf >.

Carver et al., "Real-Time Visibility Analysis and Rapid Viewshed Calculation Using a Voxel-Based Modelling Approach," GISRUK 2012 Conference, April 11-13, Lancaster UK, Apr. 13, 2012, pp. 6.

Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.

Definition "Identify", downloaded Jan. 22, 2015, 1 page.

Definition "Overlay", downloaded Jan. 22, 2015, 1 page.

Dramowicz, Ela, "Retail Trade Area Analysis Using the Huff Model," Directions Magazine, Jul. 2, 2005 in 10 pages, http://www.directionsmag.com/articles/retail-trade-area-analysis-using-th- e-huff-model/123411.

Ghosh, P., "A Solution of Polygon Containment, Spatial Planning, and Other Related Problems Using Minkowski Operations," Computer Vision, Graphics, and Image Processing, 1990, vol. 49, pp. 1-35.

GIS-NEI 3 Public _ Department of Regional Planning. Planning & Zoning Information for Unincorporated LA County. Retrieved Oct. 2, 2013 from http://gis.planning.lacounty.gov/GIS-NET3_Public/Viewer.html.

Gorr et al., "Crime Hot Spot Forecasting: Modeling and Comparative Evaluation", Grant 98-IJ-CX-K005, May 6, 2002, 37 pages.

Grifith, Daniel A., "A Generalized Huff Model," Geographical Analysis, Apr. 1982, vol. 14, No. 2, pp. 135-144.

Haralick et al., "Image Analysis Using Mathematical Morphology," Pattern Analysis and Machine Intelligence, IEEE Transactions, Jul. 1987, vol. PAMI-9, No. 4, pp. 532-550.

Hibbert et al., "Prediction of Shopping Behavior Using a Huff Model Within a GIS Framework," Healthy Eating in Context, Mar. 18, 2011, pp. 16.

Huang et al., "Systematic and Integrative Analysis of Large Gene Lists Using DAVID Bioinformatics Resources," Nature Protocols, 4.1, 2008, 44-57.

Huff et al., "Calibrating the Huff Model Using ArcGIS Business Analyst," ESRI, Sep. 2008, pp. 33.

Huff, David L., "Parameter Estimation in the Huff Model," ESRI, ArcUser, Oct.-Dec. 2003, pp. 34-36.

Ipbucker, C., "Inverse Transformation for Several Pseudo-cylindrical Map Projections Using Jacobian Matrix," ICCSA 2009, Part 1 LNCS 5592, pp. 553-564.

Levine, N., "Crime Mapping and the Crimestat Program," Geographical Analysis, 2006, vol. 38, pp. 41-56.

Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.

Mandagere, Nagapramod, "Buffer Operations in GIS," <http://www-users.cs.umn.edu/.about.npramod/enc_pdf.pdf> retrieved Jan. 28, 2010, pp. 7.

Map Builder, "Rapid Mashup Development Tool for Google and Yahoo Maps!" <http://web.archive.org/web/20090626224734/http://www.mapbuilder.net/&- gt; printed Jul. 20, 2012 in 2 pages.

Map of San Jose, CA. Retrieved Oct. 2, 2013 from http://maps.yahoo.com.

Map of San Jose, CA. Retrieved Oct. 2, 2013 from http://maps.bing.com.

Map of San Jose, CA. Retrieved Oct. 2, 2013 from http://maps.google.com.

Murray, C., Oracle Spatial Developer's Guide—6 Coordinate Systems (Spatial Reference Systems), <http://docs.oracle.com/cd/B28359_01/appdev.111/b28400.pdf>, Jun. 2009.

Open Street Map, "Amm's Diary:Unconnected ways and other data quality issues," http://www.openstreetmap.org/user/amm/diary printed Jul. 23, 2012 in 3 pages.

POI Editor, "How to: Create Your Own Points of Interest," <http://www.poieditor.com/articles/how_to create_your_own_points_of_interest/> printed Jul. 22, 2012 in 4 pages.

Pozzi et al., "Vegetation and Population Density in Urban and Suburban Areas in the U.S.A." Third International Symposium of Remote Sensing of Urban Areas Istanbul, Turkey, Jun. 2002, pp. 8.

Qiu, Fang, "3d Analysis and Surface Modeling", <http://web.archive.org/web/20091202221925/http://www.utsa.edu/lrsg/Te- aching/EES6513/08-3D.pdf> printed Sep. 16, 2013 in 26 pages.

Reddy et al., "Under the hood of GeoVRML 1.0," SRI International, Proceedings of the fifth symposium on Vurtual Reality Modeling Language (Web3D-VRML), New York, NY, Feb. 2000, pp. 23-28. <http://pdf.aminer.org/000/648/038/under_the_hood_of_geovrml.pdf>.

Reibel et al., "Areal Interpolation of Population Counts Using Pre-classi_ed Land Cover Data," Population Research and Policy Review, 2007, vol. 26, pp. 619-633.

Reibel, M., "Geographic Information Systems and Spatial Data Processing in Demography: a Review," Population Research and Policy Review, 2007, vol. 26, pp. 601-618.

Rizzardi et al., "Interfacing U.S. Census Map Files with Statistical Graphics Software: Application and Use in Epidemiology," Statistics in Medicine, Oct. 1993, vol. 12, No. 19-20, pp. 1953-1964.

Snyder, "Map Projections—A Working Manual," U.S. Geological Survey Professional paper 1395, United States Government Printing Office, Washington: 1987, pp. 11-21 and 60-70.

Sonris, "Using the Area of Interest Tools," <http://web.archive.org/web/20061001053327/http://sonris-www.dnr.state-.la.us/gis/instruct_files/tutslide12> printed Jan. 3, 2013 in 1 page.

Tangelder et al., "Freeform Shape Matching Using Minkowski Operations," The Netherlands, Jun. 1996, pp. 12.

Thompson, Mick, "Getting Started with GEO," Getting Started with GEO, Jul. 26, 2011.

Valentini et al., "Ensembles of Learning Machines", M. Marinara and R. Tagliaferri (Eds.): WIRN VIETRI 2002, LNCS 2486, pp. 3-20.

VB Forums, "Buffer a Polygon," Internet Citation, <http://www.vbforums.com/showthread.php?198436-Buffer-a-Polygon>, Specifically Thread #1, #5 & #11 retrieved on May 2, 2013, pp. 8.

Vivid Solutions, "JTS Topology Suite: Technical Specifications," <http://www.vividsolutions.com/jts/bin/JTS%20Technical%20Specs.pdf> Version 1.4, 2003, pp. 36.

Wikipedia, "Douglas_Peucker-Algorithms,"<http://de.wikipedia.org/w/index.php?title=Douglas-Peucker-Algorithmus-&oldid= 91846042> printed Jul. 2011, pp. 2.

Wikipedia, "Ramer_Douglas_Peucker Algorithm," <http://en.wikipedia.org/wiki/Ramer%E2%80%93Douglas%E2%80%93Peucker_al- gorithm> printed Jul. 2011, pp. 3.

Wongsuphasawat et al., "Visual Analytics for Transportation Incident Data Sets," Transportation Research Record 2138, 2009, pp. 135-145.

Woodbridge, Stephen, "[geos-devel] Polygon simplification," <http://lists.osgeo.org/pipermail/geos-devel/2011-May/005210.html> dated May 8, 2011, pp. 3.

(56) References Cited

OTHER PUBLICATIONS

Official Communication for EP Appln. No. 18174839.3 dated Aug. 28, 2019, 6 pages.

* cited by examiner

SYSTEMS AND METHODS FOR VISUALLY PRESENTING GEOSPATIAL INFORMATION

CROSS REFERENCE TO RELATED APPLICATIONS

This application is a continuation of U.S. patent application Ser. No. 15/788,043, filed Oct. 19, 2017, which claims the benefit under 35 U.S.C. § 119(e) of the U.S. Provisional Application Ser. No. 62/512,638, filed May 30, 2017, the content of which is hereby incorporated by reference in its entirety.

FIELD OF THE INVENTION

This disclosure relates to approaches for visually presenting geospatial information for correlation analysis.

BACKGROUND

Under conventional approaches, databases may include geospatial information. The geospatial information may be processed to provide information about particular area(s) in tabular form. Reviewing information in tabular form may not be intuitive or provide for ease in determining correlations for the geospatial information.

SUMMARY

Various embodiments of the present disclosure may include systems, methods, and non-transitory computer readable media configured to visually present geospatial information. Various embodiments of the present disclosure may include systems, methods, and non-transitory computer readable media configured to receive an information request for an area. The area may include one or more predefined regions. The predefined region(s) may be subdivided into one or more levels of predefined sub-regions. Information for the area may be accessed. The information for the area may include region information for the predefined region(s) or sub-region information for the predefined sub-regions. A response to the information request may be determined based on the region information or the sub-region information. The response may enable a visual presentation of (1) the information for the area, and (2) one or more geographical boundaries corresponding to the area.

In some embodiments, the geographical boundaries of the predefined region(s) and the predefined sub-regions may be precomputed. In some embodiments, the predefined regions/predefined sub-regions may have one or more irregular polygon boundaries.

In some embodiments, recursive relationships may exist between the predefined region(s) and the level(s) of predefined sub-regions. In some embodiments, the level(s) of predefined sub-regions may include one or more levels corresponding to at least one of country, state, county, city, or zip code.

In some embodiments, individual levels of predefined sub-regions may correspond to individual zoom levels of a user interface.

In some embodiments, the information for the area may be obtained from two or more data sources. The data sources may include disparate data. The systems, methods, and non-transitory computer readable media may be configured to normalize the disparate data.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
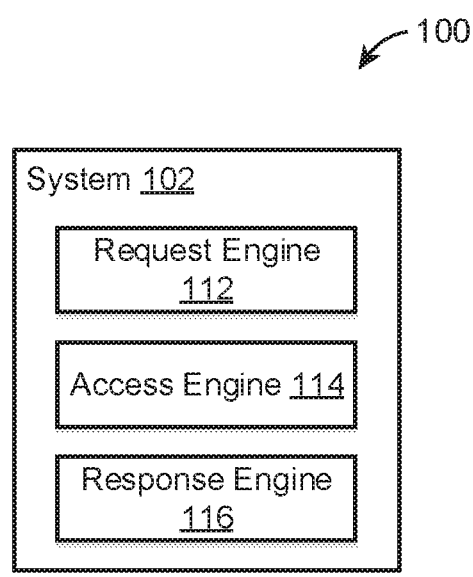
FIG. 1 illustrates an example environment for visually presenting geospatial information, in accordance with various embodiments.

A claimed solution rooted in computer technology overcomes problems specifically arising in the realm of computer technology. In various implementations, a computing system may receive an information request for an area. The request may be received, for example, via a user's selection of the area through a user interface (e.g., via bounding box, change in zoom level, selection of particular information regarding the area). The area may include one or more predefined regions. The predefined regions may be subdivided into one or more levels of predefined sub-regions. Recursive relationships may exist between the predefined regions and the level(s) of predefined sub-regions. In some embodiments, the level(s) of predefined sub-regions may include one or more levels corresponding to country, state, county, city, and/or zip code. Geographical boundaries of the predefined regions and predefined sub-regions may be shaped as regular or irregular polygons. The geographical boundaries of the predefined regions and predefined sub-regions may be precomputed. Boundaries of different regions may be precomputed while the information within the boundaries (e.g., represented by colors, patterns, locations of interest, stamping) may be computed on the fly. For example, a vectorized tile set representing the geometries of the regions/sub-regions may be computed and cached for reuse, and information about the regions (e.g., metadata for a given feature) may be computed/re-computed as needed.

The computing system may access information for the area. In some embodiments, the information for the area may be obtained from two or more data sources (e.g., general data sources, user-specific data sources). The data sources may include disparate data, and the computing system may normalize the disparate data. The information for the area may include region information for the predefined region(s) or sub-region information for the predefined sub-regions. The computing system may determine a response to the information request based on the region information or the sub-region information. The response may enable a visual presentation of (1) the information for the area and (2) one or more geographical boundaries corresponding to the area. The use of precomputed geographical boundaries may enable the computing system to quickly provide/render information regarding the area requested by a user. The use of visual presentation of the geographical boundaries along with the information for the area may enable the user to better understand the context of the information and obtain correlations for the information.

As used herein, the term "area" may refer to a definable extent. An area may refer to an extent definable in the physical world (e.g., geographical area) or an extent definable for information (e.g., grouping of information). For example, an area may refer to a particular geographical area of the world, a country, a state, or other regions. An area may refer to a particular grouping of information (conceptually projected onto a plane) based on type, subject, topic, and/or other grouping of information. While the disclosure is described herein with respect to information relating to geographical areas (e.g., displayed on a map), there is merely for illustrative purposes and is not meant to be limiting.

The approach disclosed herein enables visual presentation of geospatial information to facilitate a user's understanding of context of the geospatial information and the user's correlation analysis of the geospatial information. The use of predefined regions/sub-regions (having precomputed boundaries) allows the computing system to quickly customize views of the regions/sub-regions on a map with customer-specific geospatial information and other (e.g., general, public) geospatial information. The map may be updated based on changes in the geospatial information without re-computation of the boundaries for the predefined regions/sub-regions. The map may be visually augmented with particular customer-specific and other geospatial information to provide context for the customer-specific geospatial information, and to provide for a geo-specific correlations of the geospatial information. The use of visual presentation of the geographical boundaries of the regions/sub-regions along with the geospatial information for the predefined regions/sub-regions may enable a user to better understand the context of the geospatial information and obtain correlations for the geospatial information. Rendering views of the geospatial information on the map may be accelerated by using precomputed/cached information for individual predefined regions/sub-regions. Precomputed/cached information for different predefined regions/sub-regions may form a hierarchy of precomputed/cached information, with the structure of the hierarchy corresponding to recursive relationships between the predefined regions and predefined sub-regions.

FIG. 1 illustrates an example environment 100 for visually presenting geospatial information, in accordance with various embodiments. The example environment 100 may include a computing system 102. The computing system 102 may include one or more processors and memory. The processor(s) may be configured to perform various operations by interpreting machine-readable instructions stored in the memory. As shown in FIG. 1, in various embodiments, the computing device 102 may include a request engine 112, an access engine 114, a response engine 116, and/or other engines.

In various embodiments, the request engine 112 is configured to receive an information request for an area. The information request may be received directly at the computing system 102 (e.g., received from a user using the computing system 102) or received from another computing device (e.g., received from a user using a computing device that communicates with the computing system 102). The information request for an area may specify one or more particular areas and one or more desired information for the area(s). For example, an information request may specify a particular geographical region and the desired information about the geographical region. An information request may be received at once or in multiple parts. For example, the request engine 112 may receive an information request specifying both the area and the desired information in a single communication. The request engine 112 may receive an information request in parts—for example, a first communication may specify a particular area and a second communication may specify the desired information for the particular area. Other arrangements/structures of information requests are contemplated.

An area may include one or more predefined regions. Predefined region(s) may be subdivided into one or more levels of predefined sub-regions. Predefined regions and predefined sub-regions may be defined by boundaries (e.g., geographical boundaries). The boundaries of the predefined regions/predefined sub-regions may be shaped as regular polygons and/or irregular polygons. Recursive relationships may exist between the predefined region(s) and the level(s) of predefined sub-regions. That is, two or more predefined sub-regions of a particular level may make up a predefined sub-region of a higher level or a predefined region. For example, two of more predefined sub-regions of a second level may make up a predefined sub-region of a first level. Two or more predefined sub-regions of the first level may make up a predefined region. In some embodiments, the level(s) of predefined sub-regions may include one or more levels corresponding to at least one of country, state, county, city, or zip code. For example, an area may include a particular country, predefined regions may correspond to the different states of the country, predefined sub-regions of a first level may correspond to the different counties of the various states, predefined sub-regions of a second level may correspond to the different zip codes of the various counties, and so forth.

In some embodiments, one or more predefined regions/predefined sub-regions may be defined by one or more arbitrary boundaries. For example, a user may set as a predefined region/predefined sub-region an arbitrary combinations of zip codes/cities to facilitate viewing of information for the arbitrary region (e.g., creating a combination of zip codes/cities as a sales region to facilitate viewing of sales information for the particular zip codes/cities). In some embodiments, one or more arbitrary regions may be composed of sub-regions (e.g., zip codes/cities), and may themselves exist as children of an existing pre-defined region (e.g., states). Such hierarchical relationships between regions/sub-regions may allow for defining one or more regions based on non-geographic criteria, with such regions being parent/children of geographic regions. For example, a user/company may define sales regions at the same level as counties (e.g., individual sales regions including one or more counties), with sales regions being children of states (e.g., multiple sales regions make up a state) and parents of zip codes (e.g., multiple zip codes make up a sale region). Other arbitrary boundaries are contemplated.

The use of predefined regions and predefined sub-regions may facilitate visual presentation of geospatial information. Geospatial information may refer to information that is associated with one or more particular locations. Geospatial information may be static (e.g., does not change with time) or variable (e.g., changes with time). For example, a user may have geospatial information which may be reviewed as text/number, and/or in a tabular form. The presentation of information in text/number/tabular form may not facilitate the user's understanding of the context of the information and/or the user's correlation analysis of the information. The computing system 102 may enable the user to tie geospatial information to particular predefined regions/sub-regions, and enable the user to review the geospatial information along with the boundaries of the regions/sub-regions (e.g., visualize custom data for an area on a map of the area). Such visual presentation of the geospatial information may facilitate the user's understanding of the context of the information and/or the user's correlation analysis of the information. The use of predefined regions and predefined sub-regions may enable a user to integrate geospatial information into a model defined by the predefined regions and predefined sub-regions for analysis and operation.

The use of predefined regions and predefined sub-regions may enable a user to combine two or more geospatial information for visual presentation. A user may use the predefined regions/sub-regions to join user-specific geospatial information with other (e.g., general, public) geospatial information to provide additional context/layers to be viewed with the user-specific geospatial information. For example, a user may use the predefined regions/sub-regions to join sales information about an area with population information for the area, and visualize the sale information in addition to/along with the population information for the predefined regions/sub-regions within the area. Other combinations of geospatial information are contemplated.

In some embodiments, an information request for an area may be received through a user interface. The user interface may display a map of a geographic area and may enable a user to select a particular region within the map as the area for which information is desired. The user interface may display one or more options from which a user may select particular information desired for the selected area.

The user interface may enable a user to select (e.g., via a drawing tool, via a mouse click, via a key entry) the area for which information is desired. In some embodiments, a user's selection of a particular region within the map may include the user's selection of the extent of the map presented within the user interface. A user may change the extent of the map represented within the user interface based on changes in zoom and/or latitude/longitude of the area presented within the user interface. The portion of the map presented the user interface may correspond to the area selected by the user. As another example, a user's selection of a particular region within the map may include the user's selection of particular datasets. A user may select a particular dataset that includes information regarding one or more portions within the map and those portions may correspond to the area selected by the user.

In some embodiments, the user interface may enable changes in zoom levels. Zoom levels may define the extent of the map/area/regions/sub-regions shown in the user interface. In some embodiments, predefined regions and levels of predefined sub-regions may correspond to individual zoom levels of the user interface. Zoom levels may define whether the user interface displays boundaries of the predefined regions and/or boundaries of a certain level of predefined sub-regions. For example, when using the zoom level with the smallest magnification (showing the largest extent of the map), the user interface may display the boundaries of predefined regions. When using the zoom level with the largest magnification (showing the smallest extent of the map), the user interface may display the boundaries of the lowest level of predefined sub-regions. The user interface may also provide the user with a choice between multiple different sets of sub-regions for a given zoom level. Other correspondence between zoom levels and boundaries of predefined regions/sub-regions are contemplated.

Tying the type of boundaries shown in the user interface to zoom levels may allow the user to change the type (e.g., amount of details) of the information retrieved relating to an area based on the zoom level used to view the area. For example, a user using the user interface to view a zoomed-out view of the map may be shown information aggregated for larger portions of the map than user using the user interview to view a zoomed-in view of the map. In some embodiments, a user may manually change the type of boundaries shown in the user interface without changes in the zoom level. For example, a user may, while staying at the same zoom level, prompt the user interface face to show (1) a more detailed version of the map (e.g., showing boundaries of lower levels of predefined sub-regions) or (2) a less detailed version of the map (e.g., showing boundaries of higher levels of predefined sub-regions/predefined regions).

In various embodiments, the access engine 114 is configured to access information for an area. Information for the area may be accessed from one or more storage locations. A storage location may refer to electronic storage located within the computing system 102 (e.g., integral and/or removable memory of the computing system 102), electronic storage coupled to the computing system 102, and/or electronic storage located remotely from the computing system 102 (e.g., electronic storage accessible to the computing system 102 through a network). The information for the area may be stored in one or more databases. The information for the area may be stored within a single file or across multiple files.

The information for the area may include region information for the predefined region(s) or sub-region information for the predefined sub-regions. Recursive relationships may exist between region information and sub-region information. That is, sub-region information for two or more predefined sub-regions may be used to determine region information for a particular predefined region. For example, a predefined region may correspond to a state and predefined sub-regions may correspond to different counties within the state. The sub-region information for the counties may be used to determine the region information for the state.

Information determined for a given predefined region/sub-region may be stored (e.g., cached) as precomputed information for the given predefined region/sub-region. For example, a predefined region may include two predefined sub-regions. Precomputed information for the predefined region may be cached for the predefined region and precomputed information for the individual predefined sub-regions may be cached for the individual sub-regions. Based on the information request, the information cached for the relevant region/sub-region may be accessed. Caching pre-computing information may accelerate rendering views of the region information/sub-region information.

Information for an area may include geospatial information for the area, the predefined regions, and/or the predefined sub-regions. Information for the area may be generated based on merging of multiple data (e.g., data tables) based on relationships among the data. Individual data may include/be combined with location data to form geospatial information for the area. For example, information for an area may be generated based on merging of multiple data relating to vehicles within the area. Data relating to different types of vehicles may be stored in separate databases/tables, and the data may be merged to form the vehicle data for the area. Individual data within the vehicle data may include/be combined with location data for specific vehicles (e.g., obtained from GPS) to form geospatial information for the area. Location data may define a specific location in the world (e.g., specific latitude and longitude at a given time) or may define a particular predefined region/sub-region.

Information for an area may include user-specific geospatial information and other (e.g., general, public) geospatial information. For example, user-specific geospatial information may include sales information for an area while other geospatial information may include population information for the area. Other combinations of geospatial information are contemplated. Combination of other geospatial information with user-specific geospatial information may provide additional context/layers to be viewed with the user-specific geospatial information.

In some embodiments, the information for the area may be obtained from two or more data sources. The data sources may include disparate data. The access engine 114 may be configured to normalize the disparate data. Normalizing the data may include modifying one or multiple disparate data to make them compatible for comparison. Normalizing the data may include smoothing datasets to use different datasets together. For example, census information for an area may be obtained from two organizations that track the population differently (e.g., via different sized regions, via different demographics). The access engine 114 may normalize the census information so that the information may be visually presented together.

In various embodiments, the response engine 116 is configured to determine a response to the information request based on the region information, the sub-region information, and/or other information. Determining responses to information requests may include one or more operations on the region information and/or the sub-region information. Operations on the region/sub-region information may include aggregating, joining, determining maximum/minimum, filtering, determining distribution, determining average, and/or other operations on the region/sub-region information. The response engine 116 may be configured to change the accuracy of the response based on the levels of information used to determine the response. For example, the response engine 116 may use region information for a large area to provide a more approximated response. The response engine 116 may use sub-region information for small areas to provide a more accurate response. The response engine 116 may enable users to choose different levels of accuracy and/or sizes of areas for information. Changing the levels of accuracy/sizes of areas may result in different amounts of resource consumption (e.g., processing power, memory usage, duration of processing) to determine responses to information requests. For example, the response regime 116 may enable users to see slower responses with higher accuracy for a larger area or to see quicker responses with lower accuracy for a smaller area. The response engine 116 may recursively determine a response to an information request for an area based on the region information and the sub-region information. For example, desired information for an area may be determined by (1) determining the desired region information based on the sub-region information, and (2) determining the desired information for the area based on the region information.

Use of the region information and the sub-region information to determine the response may enable the response engine 116 to focus on the necessary data. For example, if the information request is for a particular county (a predefined sub-region) of a particular state (e.g., a predefined region), the response engine 116 may access the sub-region information for the particular county to determine the response, rather than accessing and shifting through the region information for the state to determine the response.

Use of the region information and the sub-region information to determine the response may enable the response engine 116 to approximate a response when the necessary data is not available. For example, if the information request is for a particular county (a predefined sub-region) of a particular state (e.g., a predefined region), the response engine 116 may attempt to access the sub-region information for the particular county. The sub-region information for the particular county may not exist. In some embodiments, the response engine 116 may use null data to provide a response to the information request. In some embodiments, the response engine 116 may use the region information for the particular state and modify the response to approximate the response for the particular county.

The response may enable a visual presentation of (1) the information for the area, and (2) one or more geographical boundaries corresponding to the area. The response engine 116 may use the geographical boundaries of the predefined regions and predefined sub-regions (e.g., shaped as regular or irregular polygons) to determine the response to the information request. The response may be determined by the response engine 116 as different visuals (e.g., different colors, patterns, locations of interest, stamping). The geographical boundaries of the predefined regions/sub-regions may be precomputed and the visuals determined based on the information request may be used to augment the view of the area defined by the geographical boundaries. For example, the response engine 116 may use the region information/sub-region information to determine in what color to shade a particular region/sub-region defined by precomputed geographical boundaries. Other uses of visuals are contemplated.

The use of precomputed geographical boundaries may enable quick/efficient visual presentation of (1) the information for the area, and (2) the geographical boundaries corresponding to the area. Drawing boundaries of a region/sub-region may be computationally much more expensive than visually augmenting (e.g., coloring) the drawn region. Thus, drawings boundaries of different regions/sub-regions within a map may be the main cost of presenting the map while visually augmenting the drawn map may be accomplished at little cost. The response engine 116 may use precomputed geographical boundaries (e.g., cached vectorized tile set representing the geometries of the regions/sub-regions) to quickly present the boundaries of the area while using the region/sub-region information to determine visual augmentations for the area. The boundaries of an area may be computed and cached for reuse, and information about the area (e.g., metadata for a given feature) may be computed/re-computed as needed.

For example, an initial information request may request information regarding a particular state including a number of counties. A user may zoom into the map to request information regarding a particular county divided into smaller sub-regions (e.g., by cities, by zip codes). The response engine 116 may use the precomputed geographical boundaries to provide a map view of the relevant area while computing the visual augmentation on the fly based on the relevant region/sub-region information. The use of precomputed geographical boundaries may enable the response engine 116 to quickly provide/render information regarding the area requested by the user. The use of visual presentation of the geographical boundaries along with the information for the area may enable the user to better understand the context of the information and obtain correlations for the information.

The response engine 116 may use the region information/sub-region information to provide visual augmentations that are correlated to the region information/sub-region information. For example, one form of visual augmentation may include stamping. Stamping may refer to placing visuals (e.g., icons) representing a particular object/characteristic within a map to represent the location of the particular object/characteristic. For example, locations of a certain type of stores may be stamped on a map to provide a visual presentation of the stores. However, the number of stamping possible on a map is limited by the number of pixels used to display the map, and the number of stores within a given area may be too numerous to stamp every single store location on the map. The number of stamps may be reduced by providing an approximated views of the locations. A simple method of reducing the number of stamps may be to randomly choose which stamps will be shown on the map. For example, the stamps may be generated at random. Between overlapping stamps (overlaps caused by proximity of store locations), the later generated stamps may be chosen to be displayed on the map. However, such a simplification of stamps may result in loss of information pertinent to a user.

The response engine 116 may provide for reducing the number of stamps based on the region information/sub-region information. Rather than reducing the number of stamps randomly, the response engine 116 may choose which stamps to be presented as part of the response based on the pertinent information. Returning to the store stamping example, the response engine 116 may use the region information/sub-region information to choose which stamps to include in the response based on the user-specific information and/or other (e.g., general, public) information. For example, using the user-specific information, the response engine 116 may choose to present stamps for stores with the high sales/popularity, or to present stamps for stores in locations with high population/high income. Other combinations of user-specific information and other information for visual augmentation are contemplated.

The use of visual presentation of the geographical boundaries along with the information for the area may enable the user to better understand the context of the information and obtain correlations for the information. For example, providing geospatial information relating to health costs with geographical boundaries of areas (e.g., geographical boundaries corresponding to different hospital service areas) may enable a user to detect anomalous spending by particular hospitals, for particular treatments, and/or for particular patients. As another example, providing geospatial information relating to shipping costs by geographical boundaries of areas (e.g., geographical boundaries corresponding to zip codes, different distribution centers) may enable a user to determine which future distribution center location may have the greatest impact on reducing the costs of distribution. Other provision of content/correlations for information are contemplated.

Figure 2A:
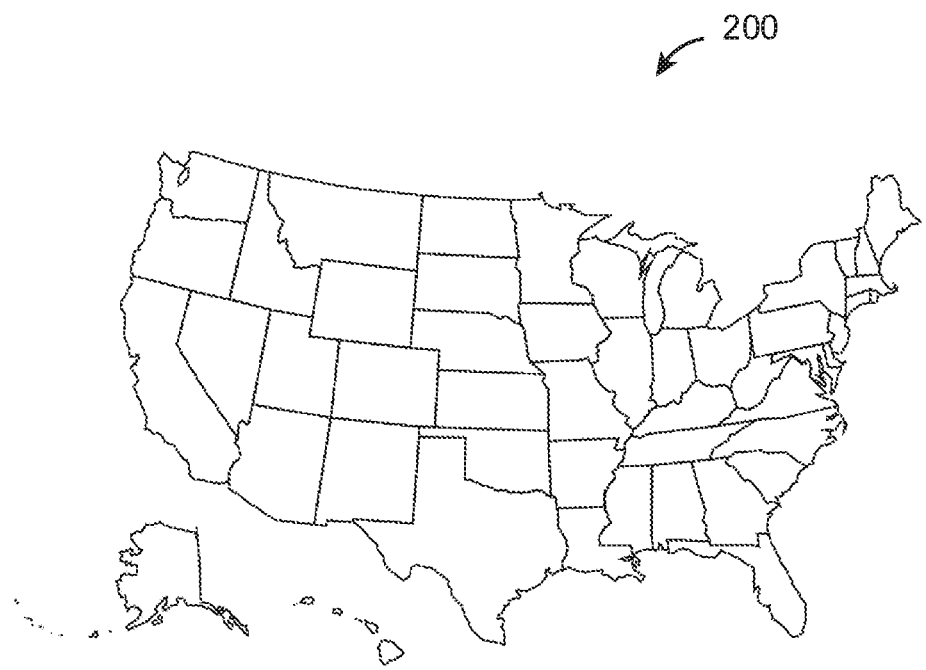
FIG. 2A illustrate example boundaries of an area and predefined regions, in accordance with various embodiments.

FIG. 2A illustrate example boundaries of an area 200 and predefined regions within the area 200, in accordance with various embodiments. The area 200 may include a country (e.g., USA), and the predefined regions may correspond to different states of the country. Recursive relationships may exist between the area 200 and the predefined regions within the area 200. Other types/boundaries of the area and predefined regions are contemplated. Information for the area 200 may include geospatial information for the area (e.g., USA), the predefined regions (e.g., states), and/or predefined sub-regions. Information for the area 200 may include user-specific geospatial information and other (e.g., general, public) geospatial information.

The boundaries of the area 200 and the predefined regions within the area 200 may be computed and cached for reuse. Information about the area 200/predefined regions may be computed/re-computed as needed. The use of precomputed geographical boundaries of the area 200 and the predefined regions may enable faster provision/rendering of information regarding the area 200 requested by the user. Provision/rendering of views of geospatial information for the area 200 may be accelerated by using precomputed/cached information for the area 200/predefined regions. Precomputed/cached information for the area 200/predefined regions may form a hierarchy of precomputed/cached information, with the structure of the hierarchy corresponding to recursive relationships between the area 200 and the predefined regions.

Figure 2B:
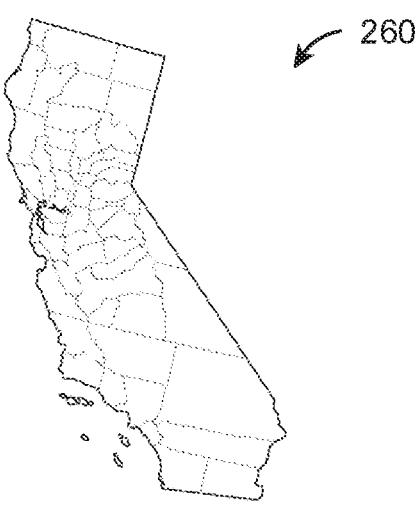
FIG. 2B illustrate example boundaries of a predefined region and predefined sub-regions, in accordance with various embodiments.

FIG. 2B illustrate example boundaries of a predefined region 260 and predefined sub-regions within the predefined region 260, in accordance with various embodiments. The predefined region 260 may include a state (e.g., California), and the predefined sub-regions may correspond to different counties of the state. Recursive relationships may exist between the predefined region 260 and the predefined sub-regions within the predefined region 260. Other types/boundaries of the predefined region and predefined sub-regions are contemplated. Information for the predefined region 260 may include geospatial information for the predefined region 260 (e.g., California), the predefined sub-regions (e.g., counties), and/or other predefined sub-regions (e.g., cities, zip codes). Information for the predefined region 260 may include user-specific geospatial information and other (e.g., general, public) geospatial information.

The boundaries of the predefined region 260 and the predefined sub-regions within the predefined region 260 may be computed and cached for reuse. Information about the predefined region 260/predefined sub-regions may be computed/re-computed as needed. The use of precomputed geographical boundaries of the predefined region 260 and the predefined sub-regions may enable faster provision/rendering of information regarding the predefined region 260 requested by the user. Provision/rendering of views of geospatial information for predefined region 260 may be accelerated by using precomputed/cached information for the predefined region 260/predefined sub-regions. Precomputed/cached information for the predefined region 260/predefined sub-regions may form a hierarchy of precomputed/cached information, with the structure of the hierarchy corresponding to recursive relationships between the predefined region 260 and the predefined sub-regions.

Figure 3:
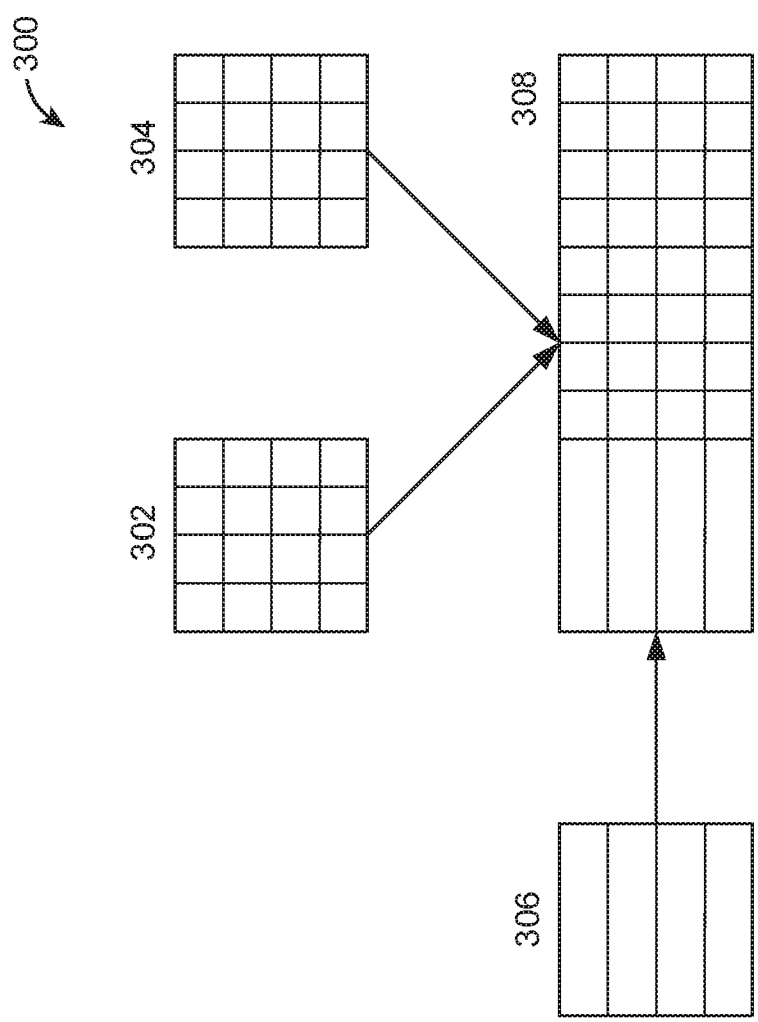
FIG. 3 illustrates an example process for merging information, in accordance with various embodiments.

FIG. 3 illustrates an example process 300 for merging information, in accordance with various embodiments. Information (e.g., for an area/predefined region/predefined sub-region) may be generated based on merging of multiple data 302, 304. The data 302, 304 may be merged based on relationships among the data 302, 304. The merged data may be combined with location data 306 to form geospatial information 308 for an area/predefined region/predefined sub-region. For example, data 302, 304 may include data relating to vehicles within an area. The data 302, 304 may be stored in separate databases/tables, and the data 302, 304 may be merged to form the vehicle data for the area. Individual data within the vehicle data may be combined with location data 306 for the specific vehicle (e.g., obtained from GPS) to form geospatial information 308 for the area. Location data 306 may define a specific location in the world (e.g., specific latitude and longitude at a given time) or may define a particular predefined region/sub-region. In embodiments, the data 302, 304 may include disparate data, and the data 302, 304 may be normalized to make them compatible for comparison. Normalizing the data 302, 304 may include smoothing datasets within the data 302, 304 to use different datasets together.

Figure 4:
FIG. 4 illustrates an example interface for visually presenting geospatial information, in accordance with various embodiments.

FIG. 4 illustrates an example interface 400 for visually presenting geospatial information, in accordance with various embodiments. In various embodiments, the user interface 400 may be accessed through a software application running on a computing device (e.g., computers, mobile phones, tablets, etc.) that includes one or more processors and memory. For example, the user interface 400 may be accessible through a web browser. In another example, the user interface 400 may be provided through a data analysis application. In yet another example, the user interface 400 may be provided as a service over a network (e.g., software as a service). Depending on the computing device, the user may be able to interact with the user interface 400 using various input devices (e.g., keyboard, mouse, etc.) and/or touch gestures. The user interface 400 is provided merely as an example and, naturally, the arrangement and configuration of such user interfaces can vary depending on the implementation. Thus, depending on the implementation, the user interface 400 may include additional features and/or alternative features.

The user interface 400 may include a title field 402, a tool set field 404, an information region 406, a display region 408, zoom options 410, and/or other fields, regions, options. The title field 402 may display the title of the information (e.g., map type) being displayed in the user interface 400. The tool set field 404 may include one or more tools to use and/or change the information displayed in the interface user 400. For example, the tool set field 404 may include a search field that enables a user to search for particular features, data addition/removal field that enables a user to add/remove data from the map, export field that enables a user to export a given map/given display of a map, and/or other fields. The information region 406 may display one or more types of information (e.g., histograms, information selection, area selection) relating to one or more areas/predefined regions/predefined sub-regions within the display region 408. The display region 408 may display one or more portions of a map (including one or more areas/predefined regions/predefined sub-regions) and/or other information. The display region 408 may display one or more particular information about the map (e.g., icons representing numbers/locations of particular objects within the map, heat map, color shading, other visual augmentations).

A user may use the zoom option 410 to change (e.g., increase, decrease) the level of zoom for the map/information displayed within the display region 408. Zoom levels may correspond to a particular type of predefined regions/predefined sub-regions displayed within the display region 408. For example, increasing the zoom level (more magnified view of the map) may enable a user to view predefined sub-regions (e.g., corresponding to counties, zip codes). Information for the area may be subdivided into region information (for individual predefined region) and sub-region information (for individual predefined sub-regions). A response to an information request may be determined recursively based on the region information and the sub-region information. A response to an information request may be determined based on precomputed information cached for particular predefined regions/predefined sub-regions.

The determined response may be presented within the information region 406 and/or the display region 408. The determined response may be presented as visual augmentation (e.g., as colors, patterns, locations of interest, stamping) of the map presented within the display region 408. For example, an information request may seek information relating to store locations within the area shown within the display region 408. The response may be shown as circles within the display region 408, with the location of the circles corresponding to the location of certain stores, and the size of the circle corresponding to particular information (e.g., sales number for the stores, population being served by the store) about the stores.

In some embodiments, the information region 406, the display region 408, and/or other regions may provide information about the types of information available for view within the user interface 400. For example, the information region 406 may display a listing of types of information available for viewing within the display region 408, and the display region 408 may display bounding boxes representing the regions for which the information is available. Selection of a particular type of information in the information region 406 and/or a particular bounding box within the display region 408 may automatically switch the view within the display region 408 to display the selected region/information.

Figure 5:
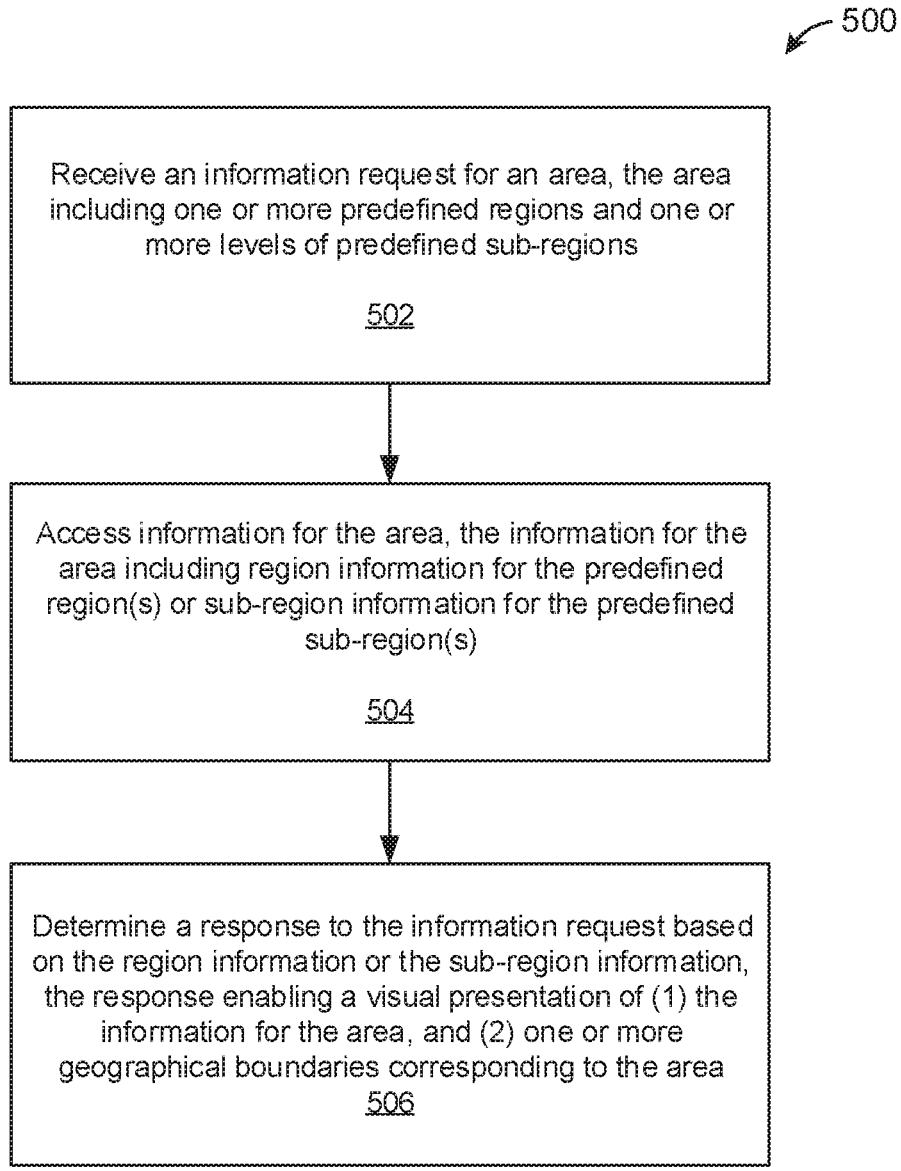
FIG. 5 illustrates a flowchart of an example method, in accordance with various embodiments.

FIG. 5 illustrates a flowchart of an example method 500, according to various embodiments of the present disclosure. The method 500 may be implemented in various environments including, for example, the environment 100 of FIG. 1. The operations of method 500 presented below are intended to be illustrative. Depending on the implementation, the example method 500 may include additional, fewer, or alternative steps performed in various orders or in parallel. The example method 500 may be implemented in various computing systems or devices including one or more processors.

At block 502, an information request for an area may be received. The area may include one or more predefined regions and one or more levels of predefined sub-regions. At block 504, information for the area may be accessed. The information for the area may include region information for the predefined region(s) or sub-region information for the predefined sub-region(s). At block 506, a response to the information request may be determined based on the region information or the sub-region information. The response may enable a visual presentation of (1) the information for the area, and (2) one or more geographical boundaries corresponding to the area.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
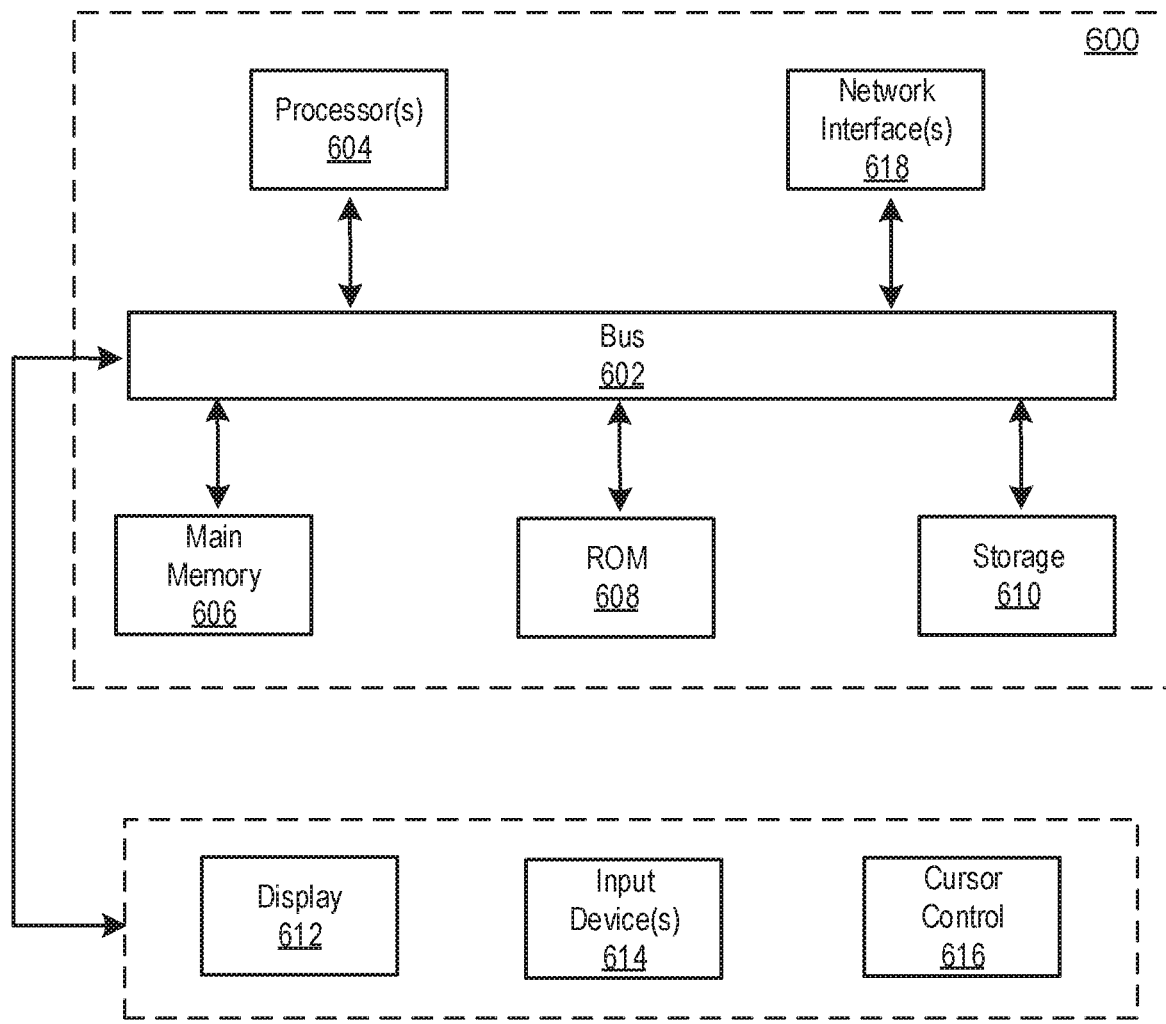
FIG. 6 illustrates a block diagram of an example computer system in which any of the embodiments described herein may be implemented.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:
1. A system comprising:
one or more processors; and
a memory storing instructions that, when executed by the one or more processors, cause the system to perform:
  precomputing, by a computing device, geographical boundaries of a plurality of regions to be displayed through an interface as vectorized tiles, wherein each of the plurality of regions is associated with geospatial information comprising a plurality of objects;
  caching, by the computing device, the vectorized tiles for the plurality of regions for reuse;
  receiving, by the computing device, a first request specifying an area and a second request specifying information of the area;
  displaying, by the computing device, a map of the area specified in the first request on the interface;
  receiving, by the computing device, a selection of one or more selected regions of the plurality of regions on the map displayed on the interface;
  obtaining, by the computing device, information of the one or more selected regions;
  obtaining, by the computing device, based on non-geographical criteria, sub-regions within each of the one or more selected regions, the determination of the sub-regions comprising demarcating each of the sub-regions based on a type of contextual information;
  determining visual augmentations within at least a portion of the sub-regions to be displayed on the interface based on the obtained information of the one or more selected regions and based on the non-geographical criteria, wherein the determining comprises:
 determining a number of visual icons to be displayed on the interface based on a criterion that includes a restriction of a number of pixels used to display the map, wherein the visual icons represent a subset of the objects to be populated on the interface;
 ranking the objects;
 selectively displaying the visual icons according to rankings of the objects; and
 displaying the visual icons at one or more different sizes based on the type of the contextual information; and
 displaying the visual augmentations on the interface as a response to the first request and the second request.

2. The computer-implemented method of claim 1, further comprising:
 displaying one or more user-selectable bounding boxes covering one or more other regions in the map of the area that are not selected, wherein the one or more user-selectable bounding boxes indicate that the geospatial information is also available in the one or more other regions.

3. The computer-implemented method of claim 1, wherein the regions are hierarchically defined at different levels, and a high-level region includes a plurality of low-level regions.

4. The computer-implemented method of claim 3, wherein the displaying of the map of the area specified in the first request on the interface comprises:
 displaying a first option on the interface to adjust a zoom level of the map, wherein a zoomed-out level view of the map shows a larger portion of the map with boundaries of high-level regions, and a zoomed-in level view of the map shows a smaller portion of the map with boundaries of the low-level regions.

5. The computer-implemented method of claim 4, wherein the displaying of the map of the area specified in the first request on the interface comprises:
 displaying a second option on the interface to adjust a granularity of the map without adjusting the zoom level of the map, wherein changing the granularity of the map from low to high enables the map to show low-level regions without changing a portion size of the map being displayed.

6. The computer-implemented method of claim 1, wherein the regions correspond to one or more of country, state, county, city, or zip code.

7. The computer-implemented method of claim 1, wherein the determining of the visual icons for the objects comprises:
 determining two visual icons are overlapping; and
 determining a later generated visual icon of the two visual icons to be displayed.

8. The computer-implemented method of claim 1, wherein the geospatial information for each of the plurality of regions further comprises public geospatial information of the objects located in the region.

9. The computer-implemented method of claim 8, wherein the determining visual augmentations to be displayed on the interface further comprises:
 selecting the objects located in the selected regions based on user-specific geospatial information and the public geospatial information of the objects.

10. A system comprising:
 one or more processors; and
 a memory storing instructions that, when executed by the one or more processors, cause the system to perform:
  precomputing, by a computing device, geographical boundaries of a plurality of regions to be displayed through an interface as vectorized tiles, wherein each of the plurality of regions is associated with geospatial information comprising a plurality of objects;
  caching, by the computing device, the vectorized tiles for the plurality of regions for reuse;
  receiving, by the computing device, a first request specifying an area and a second request specifying information of the area;
  displaying, by the computing device, a map of the area specified in the first request on the interface;
  receiving, by the computing device, a selection of one or more selected regions of the plurality of regions on the map displayed on the interface;
  obtaining, by the computing device, information of the one or more selected regions;
  obtaining, by the computing device, based on non-geographical criteria, sub-regions within each of the selected regions, the determination of the sub-regions comprising demarcating each of the sub-regions based on a type of contextual information;
  determining visual augmentations within at least a portion of the sub-regions to be displayed on the interface based on the obtained information of the one or more selected regions and based on the non-geographical criteria, wherein the determining comprises:
   determining a number of visual icons to be displayed on the interface based on a criterion that includes a restriction of a number of pixels used to display the map, wherein the visual icons represent a subset of the objects to be populated on the interface;
   ranking the objects; and
   selectively displaying the visual icons according to rankings of the objects;
  displaying the visual augmentations on the interface as a response to the first request and the second request; and
  displaying one or more selectable bounding regions encompassing one or more other regions in the map of the area that are unselected, wherein the one or more selectable bounding regions indicate that the geospatial information is also available in the one or more other regions.

11. The system of claim 10, wherein the determining of the visual augmentations further comprises:
 assigning different sizes to the visual icons based on values of user-specific geospatial information of the objects.

12. The system of claim 10, wherein the plurality of regions are hierarchically defined at different levels, and a high-level region includes a plurality of low-level regions.

13. The system of claim 12, wherein the displaying of the map of the area specified in the first request on the interface comprises:
 displaying a first option on the interface to adjust a zoom level of the map, wherein a zoomed-out level view of the map shows a larger portion of the map with boundaries of high-level regions, and a zoomed-in level view of the map shows a smaller portion of the map with boundaries of the low-level regions.

14. The system of claim 13, wherein the displaying of the map of the area specified in the first request on the interface comprises:
- displaying a second option on the interface to adjust a granularity of the map without adjusting the zoom level of the map, wherein changing the granularity of the map from low to high enables the map to show low-level regions without changing a portion size of the map being displayed.

15. The system of claim 10, wherein the plurality of regions corresponding to one or more of country, state, county, city, or zip code.

16. The system of claim 10, wherein the determining of the visual icons for the one or more objects comprises:
- determining two visual icons are overlapping; and
- determining a later generated visual icon of the two visual icons to be displayed.

\* \* \* \* \*